Figure 1:
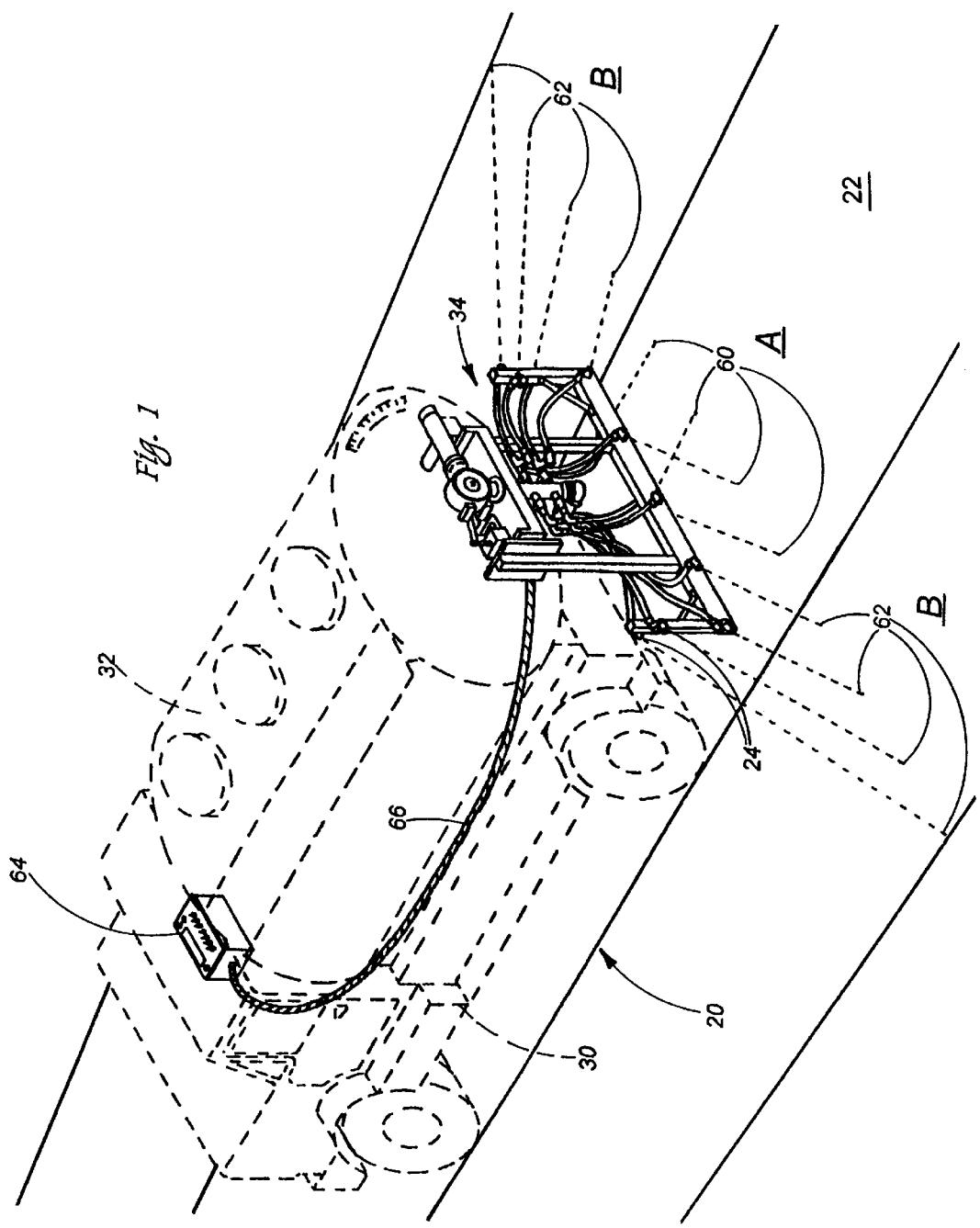

United States Patent

Brown et al.

[11] Patent Number: 5,964,410
[45] Date of Patent: Oct. 12, 1999

[54] METHOD AND APPARATUS OF UNIFORM NOZZLE LIQUID APPLICATION BY WAY OF VEHICLE

[75] Inventors: Thomas R. Brown; James K. Bertsch; Patrick C. O'Brien, all of Oregon, Ill.

[73] Assignee: E.D. Etnyre & Co., Oregon, Ill.

[21] Appl. No.: 09/002,968

[22] Filed: Jan. 5, 1998

[51] Int. Cl.[6] ........................................ B05B 1/20
[52] U.S. Cl. .................. 239/159; 239/163; 239/167; 239/447; 137/513.3
[58] Field of Search ........................... 239/155, 159, 239/163, 167, 447; 137/513.3

[56] References Cited

U.S. PATENT DOCUMENTS

| | | | |
|---|---|---|---|
| 2,229,467 | 1/1941 | Maxwell | 299/59 |
| 2,976,647 | 3/1961 | Pickrell | 239/159 X |
| 2,991,016 | 2/1961 | Allenbaugh, Jr. | 239/458 |
| 3,445,065 | 5/1969 | Waldrum | 239/159 |
| 3,539,112 | 11/1970 | Thompson | 239/452 |
| 3,661,175 | 5/1972 | Tillman | 137/513.3 X |
| 3,684,192 | 8/1972 | McMillan | 239/452 |
| 3,742,701 | 7/1973 | Feemster et al. | 60/258 |
| 4,052,003 | 10/1977 | Steffen | 239/155 X |
| 4,252,274 | 2/1981 | Kubacak | 239/163 |
| 4,394,972 | 7/1983 | Potter | 239/453 |
| 4,817,870 | 4/1989 | Dalton | 239/157 |
| 4,932,435 | 6/1990 | Stroze et al. | 137/513.3 X |
| 5,390,696 | 2/1995 | Bird et al. | 137/513.3 X |

FOREIGN PATENT DOCUMENTS

| | | | |
|---|---|---|---|
| 703344 | 2/1965 | Canada | 239/159 |
| 252022 | 2/1970 | Russian Federation | 137/513.3 |

OTHER PUBLICATIONS

Printout of materials used on Internet Web Site for Etnyre, printed Jun. 29, 1998.

*Primary Examiner*—Andres Kashnikow
*Assistant Examiner*—Robin O. Evans
*Attorney, Agent, or Firm*—Leydig, Voit & Mayer Ltd.

[57] ABSTRACT

In a vehicle for spreading liquid material, disclosed is a spray manifold based on an inventive variable orifice nozzle, spraying beyond the vehicle span while not extending beyond the vehicle span. Because of the inventive nozzle the vehicle is able to spray beyond the span of the vehicle with a uniform application to a swath of land over varying vehicle speeds and flow rates. The disclosed nozzle achieves a constant velocity and exit flow trajectory for a wide variety of flow rates, including low flow rates. The nozzle is particularly beneficial for vertical manifold arms with horizontally mounted nozzles because the trajectory distance is constant for a wide range of flow rates. The nozzle achieves these benefits by providing a fixed flow path and a variable flow path. The nozzle includes a substantially spherical poppet having a fixed hole orifice, variably retained by a spring adjacent to the orifice of the discharge port.

13 Claims, 3 Drawing Sheets

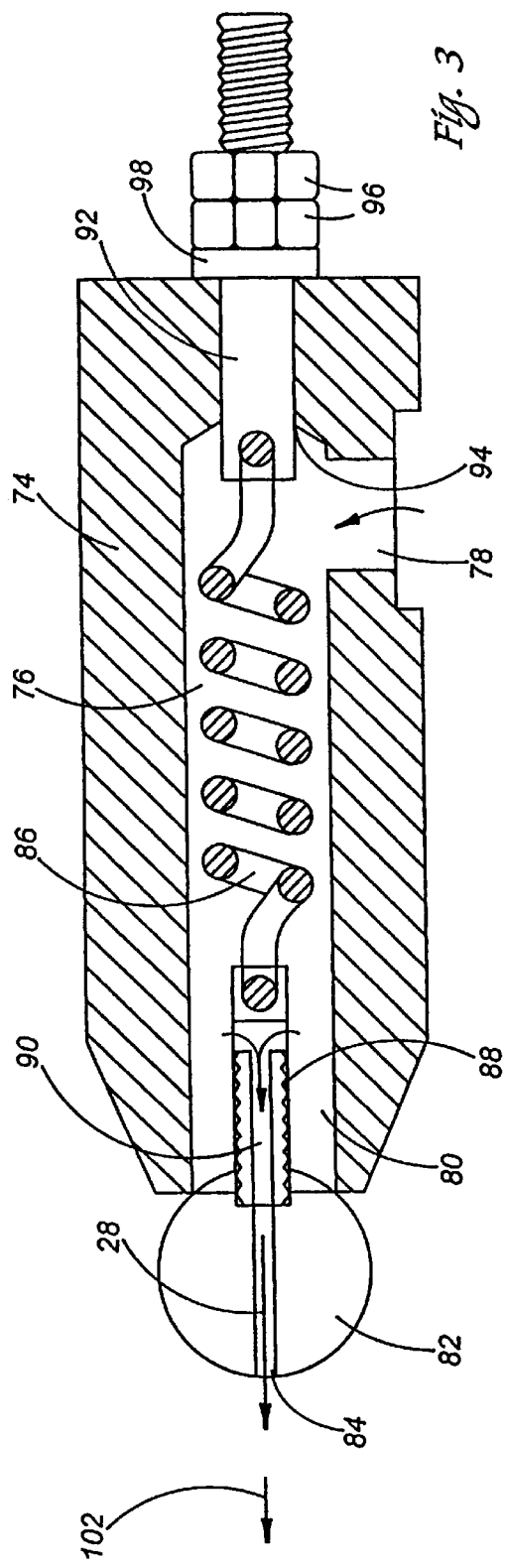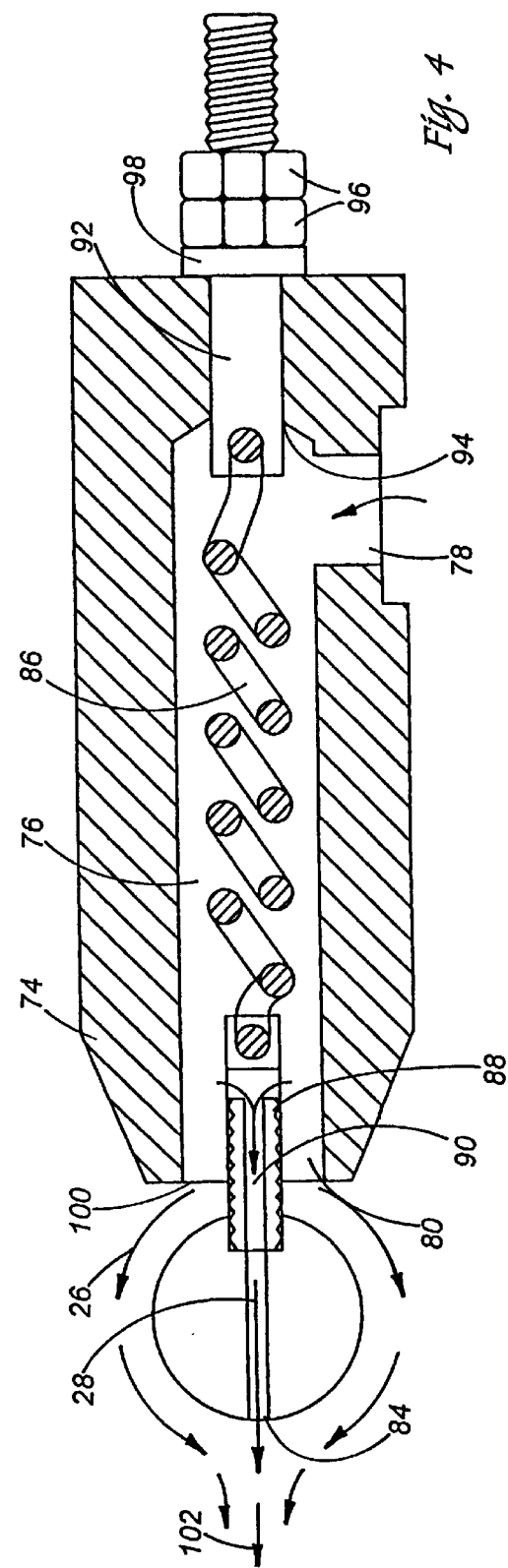

METHOD AND APPARATUS OF UNIFORM NOZZLE LIQUID APPLICATION BY WAY OF VEHICLE

FIELD OF THE INVENTION

The present invention is generally related to nozzles, and more particularly related to a spray nozzle with a variable orifice for application of liquid material to a land surface by way of a vehicle.

BACKGROUND OF THE INVENTION

Vehicle sprayers have been commonly used to spread liquids to large surface areas such as road surfaces and agricultural fields. Vehicle sprayers commonly have a tank that furnishes liquid to a sprayer manifold. In a typical sprayer manifold, a pump provides liquid through a network of hoses to arranged nozzles. Vehicle sprayers often include various control means which automatically or manually adjust the rate of flow to the nozzles. Pesticides, brine, oils, dust inhibitors, water and other liquid solutions and mixtures have been applied by vehicle sprayers.

Prior to this invention, vehicle spraying manifolds commonly comprised a horizontal bar configured with a large number of nozzles. The nozzles had one fixed orifice and a cone shaped or a V-shaped spray pattern. These nozzles were typically aligned perpendicular to the horizontal bar and directed at the ground. U.S. Pat. No. 4,817,870 assigned to Etnyre Co., the present assignee, shows a typical horizontal bar spraying apparatus and a method of achieving a uniform application rate for varying vehicle speeds and flow rates.

A problem associated with the horizontal bar configuration is that the swath of land sprayed by the vehicle is limited to the length of the bar. This limits coverage of land to the length of a short horizontal bar when obstacles exist in the path of the spray bar such as other vehicles, road signs, trees, or fences. However, horizontal bars have been used with a fixed orifice nozzle because of the many difficulties and variables inherent with vehicle sprayers and because it is highly desirable to provide uniform application of the liquid to the land surface.

One difficulty is that a vehicle sprayer often varies its speed while spraying. On board computers have adjusted the flow rate according to the vehicle speed. Another difficulty is that wind or turbulence created by movement of the vehicle has not allowed for uniform distribution of smaller liquid particles, especially at long trajectories. An additional difficulty is that nozzles are often fed liquid from the same manifold and pump, which requires balancing of flow rates among several nozzles.

Mounting vehicles with vertical manifolds that spray outside the width of the horizontal bar have not traditionally existed because of the limits associated with fixed orifice nozzles. For nozzles mounted to spray outside the width of the bar, nozzles are inclined relative to the ground. Nozzles are not aligned vertically and are not equidistant to the land surface. Despite the wide range of spray trajectories and liquid particle sizes available, fixed orifice nozzles have not allowed vehicles to spray uniformly outside the span of the bar.

Inclined fixed orifice nozzles have had significant problems when flow rate is varied. Resulting problems include a non-uniform trajectory distance and a changing liquid particle size in the discharged liquid. In fixed orifice nozzles, increasing flow rate has rapidly increased the fluid pressure inside the fixed orifice nozzle and thus increased the velocity of the discharged liquid. Changes in liquid velocity change the land surface reached by a nozzle, thus unevenly distributing liquid. The increasing fluid pressure also has caused discharged liquid particles to atomize or diminish in size. Wind and vehicle turbulence affect the smaller particles, causing uneven distribution to the land surface. The rapid changes in discharge velocity and particle size have limited the range of flow rates and thus the vehicle speeds over which inclined nozzles provide uniform liquid application to the land surface.

Simple nozzles that automatically adjust to provide a uniform trajectory and particle size for varying rates of flow when mounted severally in vehicle sprayers have not traditionally existed. Nozzles exist in other applications that adapt the orifice size based on the rate of flow. The broad concept of a spring-loaded variable flow rate nozzle is disclosed in several U.S. patents. For example, U.S. Pat. No. 3,539,112 discloses a fire hose nozzle, which includes a selected flow-regulating means in the form of a spring acting to axially bias the valve head in opposing relation to the water pressure. U.S. Pat. No. 3,742,701 discloses a liquid propellant injector having a spring-biased valve to produce a uniform spray pattern. Finally, U.S. Pat. No. 2,229,467 discloses a spring-loaded nozzle that is intended to discharge liquids carrying solid matter without clogging. U.S. Pat. No. 3,684,192 discloses a constant pressure, variable flow nozzle with two variable orifices, for use in fire fighting applications.

Because of the shortcomings of fixed orifice nozzles, and prior to this invention, the present assignee developed a nozzle with one variable orifice. The variable orifice automatically increased the flow path area to spray a stream-like fan pattern over a much wider range of flow rates than traditional fixed orifice nozzles. The variable orifice nozzle comprised a solid spherical poppet variably retained by a spring adjacent to a circular discharge port of the nozzle.

When the variable orifice nozzles were mounted inclined relative to the ground, liquid flowed around the poppet in a stream-like fan pattern and struck the land surface, spreading out in a predictable pattern. These nozzles were fluidically connected in the same manifold. The nozzles were mounted on a horizontal bar and two verticals arms of a vehicle sprayer manifold. The horizontal bar discharged liquid to a lane of road immediately behind the vehicle. The vertical arms sprayed two additional lanes, one lane on each side of the vehicle. A computer adjusted the flow rate to the nozzles according to vehicle speed.

An exemplary and significant application for the vehicle sprayer was spraying brine solution in cold weather to de-ice the road surface. By spraying liquid brine to a roadway surface, ice and snow was more quickly de-iced or liquidized which increased roadway safety. The variable orifice nozzle worked well for a wide range of higher vehicle speeds and higher flow rates. The vehicle sprayer could reach areas that previously could not be reached by other prior art vehicle sprayers because obstacles did not restrict movement or spraying of the vehicle. The vehicle sprayer could also spray multiple roadway lanes which decreased the number of unsprayed lanes.

However, the vehicle sprayer with only one variable orifice had problems. The variable orifices of the multiple nozzles fed from the same manifold did not open up equally at low vehicle speeds and low flow rates to provide uniform liquid application. When sprayer vehicles slowed down, for example to enter an intersection, vehicle speed decreased and thus flow rate decreased as well. At low flow rates, liquid flowed through only some or one of the nozzles, resulting in non-uniform liquid application. Intersections have been an important area to de-ice to prevent accidents as other vehicles stop or accelerate there. With liquid brine flowing out only some or one of the nozzles, non-uniform de-icing of the road surface had occurred.

The uniformity problems depended on how well the springs in the nozzles were balanced and how many nozzles were actively discharging liquid. For roadway spraying applications, uniformity problems had occurred at liquid applications below 20 gallons per minute. At 10 gallons per minute, the liquid typically only flowed through some nozzles, while flow through other nozzles would be completely lost. As flow rate decreased to 5 gallons per minute or less, liquid typically only flowed through 1 nozzle in the entire sprayer manifold. In terms of vehicle speeds for de-icing applications, uniformity problems as to de-icing applications occurred at flow rates corresponding to vehicle speeds of 5 miles per hour and less.

SUMMARY OF THE INVENTION

In view of the foregoing, it is a general aim of the present invention to provide a variable orifice nozzle that achieves an unchanging non-atomized liquid trajectory over a wide range of flow rates through the nozzle.

Another general aim of the present invention is to provide nozzles mounted on a vehicle sprayer that uniformly spray liquid inside and beyond the span of a nozzle set and vehicle over a wide range of flow rates, including low flow rates.

A specific object of the present invention is to provide a nozzle that minimizes changes in fluid pressure to spray a constant velocity non-atomized liquid trajectory over a wide range of flow rates.

Another specific object of the present invention is to provide a nozzle that can be easily balanced when fluidically connected to multiple nozzles in the same manifold to provide uniform flow rates among the nozzles over a wide range of flow rates, including low flow rates.

Another specific object of the present invention is to provide a nozzle that discharges liquid at a constant distance over varying flow rates when aligned at inclined angles on vehicle spray manifolds.

Figure 2:
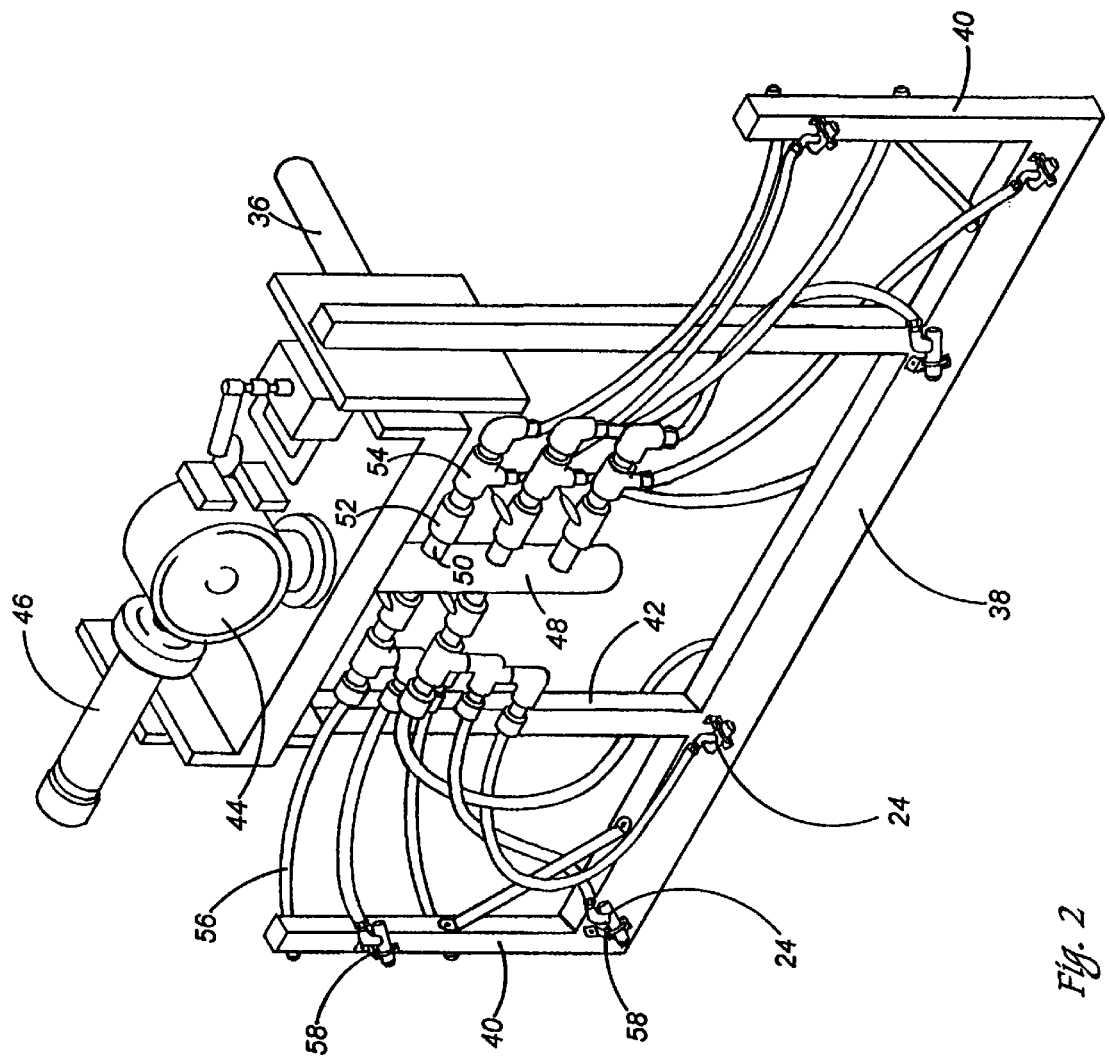

Another specific object of the present invention is to provide vehicles with vertical spray manifolds that spray the land surface uniformly over a wide range vehicle speeds and application rates, including low flow rates and vehicle speeds.

Another specific object of the present invention is to automatically and manually control the flow rate to different nozzles in a vehicle sprayer having vertical spray manifolds while maintaining uniform liquid application to a land surface.

To achieve the foregoing and other aims and objects, one embodiment of the present invention provides a nozzle with a fixed orifice and a variable orifice. A poppet variably retained to a discharge port provides the variable orifice. The poppet includes a hole through its body providing the fixed orifice. The combination of the fixed orifice and the variable orifice provides for near constant pressure, velocity and particle size in the discharged liquid trajectory. The nozzle also provides for uniform flow rates through fluidically connected nozzles at low flow rates. The nozzle also provides for precise balancing of the springs among nozzles fed from a common fluid source at higher flow rates.

The present invention, according to one embodiment, also provides for a vehicle sprayer mounted with the nozzles that uniformly discharges liquid over a wide range of flow rates, even at low flow rates. The nozzles are mounted inclined on a horizontal arm and two vertical arms. The nozzles discharge non-atomized liquid particles at a constant trajectory distance. Because of the constant horizontal liquid trajectories, liquid is uniformly distributed to the land surface inside and outside both ends of the span of the vehicle and sprayer manifold over a wide range of flow rates, including low flow rates. Because of the inventive nozzle, the flow rate can be varied without affecting the uniformity of liquid application provided by the vehicle sprayer. Thus, flow rate can be automatically adjusted and controlled relative to vehicle speed to ensure uniform spraying to the land surface, even at low flow rates. Flow rate through different nozzles can also be manually controlled to provide different flow rates through different nozzles without affecting uniformity.

These and other objects and advantages of the invention will become more apparent from the following detailed description when taken in conjunction with the accompanying drawings.

BRIEF DESCRIPTION OF THE DRAWINGS

FIG. 1 is a perspective view of a vehicle sprayer including trajectories illustrating the surface each nozzle sprays.

FIG. 2 is a perspective view of a sprayer manifold.

FIG. 3 is a half sectional view of a nozzle operating with liquid only flowing out of the fixed orifice.

FIG. 4 is a half sectional view of a nozzle with the poppet displaced, liquid flowing out both the fixed and variable orifices.

While the invention is susceptible of various modifications and alternative constructions, certain illustrative embodiments thereof have been shown in the drawings and will be described below in detail. It should be understood, however, that there is no intention to limit the invention to the specific forms disclosed, but on the contrary, the intention is to cover all modifications, alternative constructions and equivalents falling within the spirit and scope of the invention as defined by the appended claims.

DETAILED DESCRIPTION OF THE PREFERRED EMBODIMENT

The preferred embodiment of the present invention provides a vehicle sprayer 20 capable of uniformly discharging liquid material to a land surface 22 both inside and outside the span of the vehicle sprayer 20. Referring to FIG. 1, the vehicle sprayer comprises nozzles 24 mounted severally and inclined relative to the land surface 22 on a vehicle sprayer 20. The nozzles 24 are fluidically connected and adapted to permit uniform application of liquid material to a land surface over a wide range of flow rates, including low flow rates. FIGS. 3 and 4 show the preferred embodiment of the nozzle 24 that achieves uniformity by having an automatically adjusting variable orifice 26 in combination with a fixed orifice 28. As used herein, low flow rates include a range of just greater than 0 gallons per minute to just greater than 10 gallons per minute and/or any flow rates corresponding to a vehicle sprayer speed of 5 miles per hour or less.

As shown in FIG. 1, the vehicle sprayer 20 includes a truck 30, carrying a tank 32 and a sprayer manifold 34. The sprayer manifold is depicted in further detail in FIG. 2. A main support 36 secures the tank 32 and the sprayer manifold 34 to the truck 30. The sprayer manifold 34 includes a horizontal bar 38 supporting vertical arms 40, with one vertical arm 40 at each end of the horizontal bar 38. The horizontal bar 38 is supported by a sub-support 42 which is supported by the main support 36. Although two arms 40 are shown in FIGS. 1 and 2, it can be appreciated to those skilled in the art that only one arm would be necessary to spray outside only one end of the span.

The tank 32 stores and provides liquid to the nozzles 24. A pump 44, supported by the main support 36, draws liquid from the tank 32 through tank pipe 46. The pump 44 delivers liquid to manifold pipe 48. The manifold pipe 48 provides outlets 50 for liquid to exit through valves 52. The valves 52 are coupled to outlets 50 to regulate the flow rate of liquid through each of the outlets 50 individually. Liquid flows through the valves 52 and into flow dividers 54 which provide liquid flow to rubber hoses 56. The nozzles 24 are attached to the rubber hoses 56 and receive liquid therethrough. Nozzles 24 fed from the same pump 44 are fluidically connected. It can appreciated by those skilled in the art in an alternative embodiment that more than one pump could be used on the vehicle sprayer to provide separate liquid flows to different sets of fluidically connected nozzles.

To uniformly distribute liquid to the land surface 22 both inside and outside the span of the truck 30, the nozzles 24 are mounted inclined relative to the land surface 22. The nozzles 24 are held by brackets 58 onto the vertical arms 40 and the horizontal bar 38. The nozzles 24 on the horizontal bar 38 and the vertical arms 40 are adapted to spray a straight exit stream. Referring to FIG. 1, the straight exit stream is illustrated by liquid trajectories 60, 62, which show the land surface target of each nozzle. The liquid trajectories 60, 62 strike the land surface 22 and spread out in a predictable pattern. This achieves uniform overall application of liquid.

To uniformly distribute liquid within the span of the truck 30, nozzles 24 are mounted on the horizontal bar 38. The nozzles 24 mounted on the horizontal bar 38 spray liquid inclined to the land surface at inside liquid trajectories 60. The liquid trajectories 60 strike the land surface and spread out in a predictable pattern achieving uniform liquid application to the land surface inside the truck span A. The nozzles 24 are adapted to uniformly apply liquid to the span of the truck 30 over a wide range of flow rates and truck 30 speeds, including low truck 30 speeds and low flow rates.

To uniformly distribute liquid outside the truck 30 span, nozzles 24 are mounted on the vertical arms 40, or near ends of the horizontal bar 38. The nozzles near the ends of the horizontal bar 38 and on the vertical arms 40 are spaced and angled to provide outside liquid trajectories 62. Outside liquid trajectories 62 reach the land surface located substantially beyond each end of the truck 30 span and sprayer manifold 34 as indicated by swaths B. Nozzles 24 near the top of the vertical arms 40 are aligned nearly horizontal relative to the land surface to provide longer trajectories, while nozzles 24 closer to the ground on the vertical arms 40 are angled more toward the land surface 22. The outside liquid trajectories 62 uniformly distribute liquid outside both ends of the span of the truck 30 over a wide range of flow rates and truck 30 speeds, including low truck 30 speeds and low flow rates.

The preferred embodiment of present invention also provides a control means to maintain uniformity while changing truck 30 speed. The control means shown in FIG. 1 is depicted as a computer 64. The computer 64 is connected by a network of wiring 66 to pump 44. The computer 64 automatically senses truck 30 speed and then adjusts rate of flow delivered by the pump 44. This changes the flow rate through the nozzles 24 relative to truck 30 speed. The nozzles 24 automatically adjust to the flow rate to maintain constant unchanging liquid trajectories. Thus, the inside trajectories 60 and outside trajectories 62 are maintained over a changing truck 30 speed. For example, when truck 30 speed or flow rate to the nozzles 24 decreases, all desired nozzles 24 maintain flow to uniformly distribute liquid to the land surface 22.

Although uniform spraying to the land surface can be accomplished through all nozzles 24, nozzles 24 can be selected to spray at different flow rates. In the preferred embodiment of the present invention, the computer 64 also includes manual controls for regulating flow rate through nozzles 24 individually. The computer 64 is connected via the network of wiring 66 to actuate valves 52. The valves 52 regulate the flow path area to the hoses 56 and thus flow rate to individual sets of nozzles 24. The valves 52 also permit certain nozzles 24 to be completely shut off from receiving liquid flow. Because nozzles 24 automatically adjust to maintain liquid trajectory distance, different desired uniform liquid applications are possible to different portions of the land surface 22.

To provide for uniform application by the vehicle sprayer 20 over a wide range of flow rates including low flow rates, the preferred embodiment of the present invention provides the variable orifice nozzle 24 depicted in FIGS. 3 and 4.

The nozzle 24 comprises a nozzle body 74 with a hollow chamber providing a fluid conduit 76. Liquid enters at an inlet port 78 and flows through the fluid conduit 76 to a discharge port 80. Fluid flowing out the discharge port 80 above a predetermined pressure engages a poppet 82 urging the poppet 82 away from the discharge port 80. The poppet 82 includes a hole 84 and is variably retained by a spring 86 adjacent to the discharge port 80. The poppet 82 is coupled by a retainer pin 88 to create tension in the spring 86. The retainer pin 88 includes a hollow center 90 to maintain a fluidic path through the poppet 82. A threaded rod 92 resists tension created in the spring 86. The threaded rod 92 is fitted through a hole 94 in the nozzle body 74 and is secured to the nozzle body 74 by two nuts constituting a nut lock 96. A elastic rubber washer 98 between the nozzle body 74 and the nut lock 96 prevents fluid leakage between hole 94 and threaded rod 92.

The nozzle comprises two separate flow paths to provide the vehicle sprayer 20 with unchanging liquid trajectories and uniform flow rates among fluidically connected nozzles 24. In the preferred embodiment of the present invention, the first flow path is through a fixed orifice 28 as shown in FIG. 3. The fixed orifice 28 provides for uniform flow rates and liquid trajectories 60, 62 among fluidically connected nozzles at low flow rates. The hole 84 in the poppet 82 and hollow center 90 of the retainer pin 88 provide for the fixed orifice 28. Some or all of the fluid delivered through the fluid conduit 76 exits through the fixed orifice 28. The size of the fixed orifice 28 is pre-determined to provide uniform liquid trajectories 60, 62 from fluidically connected nozzles over the range of low flow rates. Due to the precision available in machining technology, the sizes of the hole 84 and hollow center 90 are easy to control to balance the flow rates among different nozzles 24 at low flow rates.

To prevent rapidly increasing fluid pressure, velocity and atomization of liquid particles the preferred embodiment of the present invention provides a variable orifice 26 for a wide range of higher flow rates as shown in FIG. 4. The variable orifice 26 maintains the non-atomized liquid trajectories 60, 62 that achieve uniform liquid application by the vehicle sprayer 20. The variable orifice 26 is created between the poppet 82 and the edge 100 of the discharge port 80 by displacement of the poppet 82. Displacement of the poppet 82 occurs when fluid pressure engaging the poppet 82 is greater than the bias of the poppet 82 against the discharge port 80 created by the spring 86. The elasticity and bias of the spring 86 is pre-determined to provide for a range of flow rates higher than the range of the fixed orifice 28.

By incorporating a spring 86 with a low constant or low stiffness into the nozzle 24, small pressure changes in the fluid conduit 76 result in large poppet 82 displacement. Because the flow path area of variable orifice 26 increases with large poppet 82 displacement, more fluid can flow through the variable orifice 26 without substantial increases in the fluid pressure in the fluid conduit 76. By maintaining relatively constant fluid pressure in the fluid conduit 76 the velocity and particle size of fluid in the exiting stream 102 is substantially constant. The spring 86 also serves to shut off the flow of fluid through the variable orifice 26. Pre-existing tension in the spring 86 creates bias of the poppet 82 against the discharge port 80. The tension predetermines the fluid pressure necessary to displace the poppet 82. Thus, flow can be effectively shut off to the variable orifice 26 below a predetermined bias point.

The preferred embodiment of the vehicle sprayer 20 uses a straight non-atomized stream-like liquid trajectories 60, 62. The stream-like liquid trajectories 60, 62 strike the land surface and spread out in a predictable fashion. The non-atomized stream-like liquid trajectories 60, 62 also greatly reduce the effects of wind and turbulence, particularly for nozzles 24 arranged to provide a long trajectory. As such the nozzles provide a straight stream-like exit stream 102 with large liquid particles.

In the preferred embodiment of the present invention, approximate nozzle symmetry, spherical shape in the poppet 82, and circular shape in the discharge port 80 create the straight non-atomized stream-like exit stream 102. Although spherical shape for the poppet 82 is shown in the preferred embodiment, it will be appreciated that other shapes for the poppet could be practiced in the present invention including but not limited to spherical, conical elliptical, and double conical. The approximate nozzle symmetry is characterized by the longitudinal axes of the spring 86, the hole 84, and the threaded rod 92 perpendicularly intersecting the center axis of a circular opening created by the edge 100 of the discharge port 80. These annular shapes and approximate symmetry ensure that liquid flows evenly through and around the poppet 82 to maintain the straight non-atomized exit stream 102 over a wide range of flow rates. At lower flow rates, liquid flows through the fixed orifice 28 and exits in a straight, non-atomizing stream 102 on the longitudinal axis of the hole 84 as shown in FIG. 3. At higher fluid pressures, the variable orifice opens 26 up as shown in FIG. 4, and the liquid divides between flow paths. Liquid now flows through the variable orifice 26 around the surface of the poppet 82 evenly. The exiting flow through the variable orifice 26 rejoins the flow from the fixed orifice 28 forming a single non-atomizing exit stream 102 on the same longitudinal axis of the hole 84. Thus, the longitudinal axis of the exit stream 102 does not materially change as flow rate increases.

The preferred embodiment of the present invention also provides for the balancing of fluidically connected nozzles 24. The balancing of the tensions among each spring 86 provides for uniform flow rates through the variable orifices 26. Predetermining the tension in the spring 86 is accomplished by displacing the threaded rod 92 away from the poppet 82. The displaced threaded rod 92 is secured firm against the nozzle body 74 near the end of the shaft 94 by fastening the nut lock 96 on the threaded rod 92.

Because the fixed orifice 28 discharges the liquid uniformly at lower flow rates, the variable orifice 26 does not need to open up so near to zero fluid pressure. This eliminates the task of precisely setting the bias of each spring 86 among fluidically connected nozzles 24 so near to zero fluid pressure. Such task was not achievable in the prior art and resulted in non-uniform liquid application to the land surface over the range of low flow rates. However, balancing fluidically connected nozzles 24 at higher flow rates in the present invention is a much easier task. At higher flow rates liquid is already moving through the fluid conduit 76 of the nozzle 24 thereby eliminating the need for force to overcome the static state of fluid in the nozzle 24. Additionally, fluid friction forces become less significant at higher flow rates.

By utilizing the nozzle 24 throughout the entire sprayer manifold 34, the vehicle sprayer 20 uniformly sprays liquid beyond the span of the truck 30, over a wide range of flow rates for both inside trajectories 60 and outside trajectories 62. Importantly, this is accomplished without appendages extending beyond the span of the truck 30. In light of the foregoing, it can be seen that the present invention provides an improved nozzle for application of liquid material to a land surface by way of a vehicle.

What is claimed is:

1. In a vehicle for spreading liquid material on a land surface having a source of liquid material and a conduit, a material distributing apparatus comprising:

a discharge element including a means for distributing liquid material covering a span of the vehicle, the span being perpendicular to a motion of the vehicle;

the discharge element including at least one arm, each arm covering a vertical range, each arm positioned near an end of the span of the vehicle, each arm not substantially extending beyond the span of the vehicle; and a plurality of nozzles configured along the vertical range of each arm and connected to the conduit, the nozzles arranged to spray liquid material beyond at least one end of the span of the vehicle, each nozzle including multiple orifices for discharging liquid material, with at least one orifice being a variable orifice.

2. The material distributing apparatus as in claim 1 wherein the multiple orifices for discharging liquid material include at least one fixed orifice.

3. The material distributing apparatus as in claim 1 wherein the at least one arm includes a first arm and second arm, with a first arm positioned near a first end of the span of the vehicle and a second arm positioned near a second end of the span of the vehicle.

4. The material distributing apparatus as in claim 1 wherein a plurality of the nozzles are fluidically connected.

5. The material distributing apparatus as in claim 1 wherein the nozzles uniformly discharge liquid material to a part of the land surface located substantially beyond the at least one end of the span of the vehicle.

6. The material distributing apparatus as in claim 1 further includes a control means responsive to vehicle speed that automatically adjusts the flow rate through the nozzles relative to vehicle speed.

7. The material distributing apparatus as in claim 1 wherein the nozzles are adapted to provide the uniform application of liquid material for a wide range of flow rates, including a range of low flow rates.

8. The material distributing apparatus as in claim 1 wherein the nozzles are inclined relative to the land surface.

9. In a vehicle for spreading liquid material to a land surface having a discharge element not substantially extending beyond the span of the vehicle, the span being perpendicular to a motion of the vehicle, a method of distributing liquid material to a desired land surface comprising:

providing a plurality of nozzles arranged among the discharge element, the nozzles adapted to discharge liquid material to the land surface inside the span and outside at least one end of the span, each nozzle including a variable orifice and a fixed orifice;

controlling the flow of the liquid material to the nozzles relative to the motion of the vehicle; and discharging liquid material to the land surface uniformly to the desired land surface over a wide range of flow rates through the fixed and variable orifices, the wide range of flow rates including a low range of low flow rates wherein liquid material flows primarily through the fixed orifice.

10. The method of distributing liquid material as in claim 9 which further includes the step of controlling the rate of flow through at least two different sets of the nozzles independently, allowing a different flow rate for each set of nozzles.

11. The method of distributing liquid material as in claim 9, wherein the low range of low flow rates includes a flow rate corresponding to a vehicle speed of 5 miles per hour.

12. The method of distributing liquid material as in claim 9, wherein the low range of low flow rates includes a flow rate of 10 gallons per minute.

13. The method of distributing liquid material as in claim 9, wherein the land outside at least one end of the span includes an outer land surface located substantially beyond the at least one end of the span of the vehicle.

* * * * *